United States Patent

[11] 3,616,108

| [72] | Inventors | William E. Whitehouse<br>La Crescenta;<br>Roger R. Riley, Glendale, both of Calif. |
|---|---|---|
| [21] | Appl. No. | 759,739 |
| [22] | Filed | Sept. 13, 1968 |
| [45] | Patented | Oct. 26, 1971 |
| [73] | Assignee | Interpace Corporation<br>Los Angeles, Calif.<br>Continuation-in-part of application Ser. No. 699,345, Jan. 22, 1968, now abandoned. |

[54] REFRACTORY CONSTRUCTION UNITS WITH HIGH-TEMPERATURE BONDING JOINT FILLERS AND METHOD OF MAKING SAID UNITS
13 Claims, 6 Drawing Figs.

[52] U.S. Cl. .................................................. 161/36,
117/94, 156/89, 161/162, 161/219, 161/247,
260/41, 266/43, 277/227
[51] Int. Cl. ........................................................ B32b 3/10
[50] Field of Search............................................ 156/89, 90;
260/41 A, 41.5, 41.5 A, 37; 264/29; 161/216, 247,
36, 162, 217, 219; 136/236, 242; 266/43; 117/194;
277/227

[56] References Cited
UNITED STATES PATENTS

| 3,227,591 | 1/1966 | Lambert et al. | 156/89 |
|---|---|---|---|
| 2,558,378 | 6/1951 | Petry | 260/41 A |
| 2,890,190 | 6/1959 | Van Volkenburgh | 260/41 A |
| 3,344,099 | 9/1967 | Cahill et al. | 260/41.5 A |
| 3,260,696 | 7/1966 | Wheat | 260/41.5 A |
| 3,347,047 | 10/1967 | Hartz et al. | 260/41.5 A |
| 1,330,148 | 2/1920 | Stromeyer | 277/227 |
| 3,337,206 | 8/1967 | Bouvier | 156/89 UX |
| 3,467,542 | 9/1969 | Nordlie | 117/94 |
| 3,222,775 | 12/1965 | Whitney | 156/89 X |
| 3,275,488 | 9/1966 | Bailey et al. | 156/89 |

FOREIGN PATENTS

| 879,993 | 12/1942 | France | 277/227 |

*Primary Examiner*—Philip Dier
*Attorney*—Miketta, Glenny, Poms & Smith

ABSTRACT: Means for facilitating setting and construction of furnaces, kilns, ladles and similar equipment units subjected to high temperatures, comprising a resilient, compressible, elastomeric composition composed essentially of an organic plastic containing a finely divided heat-resistant inorganic filler dispersed therein. The composition acts as a sealant and bonding agent between refractory blocks and metallic elements of construction units and has utility as an expansion joint filler. The invention also relates to refractory construction units provided with adhering elastomeric composition surface layers having heat-resistant inorganic fillers adapted to act as bonding joint fillers under high temperatures of use, and method of making self-sealing refractory ceramic construction units.

PATENTED OCT 26 1971 3,616,108

INVENTORS.
WILLIAM E. WHITEHOUSE
ROGER R. RILEY
BY
Miketta, Glenny, Poms & Smith
ATTORNEYS.

REFRACTORY CONSTRUCTION UNITS WITH HIGH-TEMPERATURE BONDING JOINT FILLERS AND METHOD OF MAKING SAID UNITS

This application is a continuation-in-part of our copending application Ser. No. 699,345 filed Jan. 22, 1968, now abandoned.

Refractory materials or compositions are those capable of withstanding high temperatures, that is temperatures of between about 500° C. to 2,400° C., in terms of melting or softening, resistance to molten metal, slags, glass, etc. and resistance to spalling, loss of structural strength, etc. at temperatures of use in furnaces, kilns, ladles, annealing ovens, crucibles, etc. Refractories are generally classified as being either acidic or basic (in chemical characteristics), siliceous refractory compositions being classed as acidic and those with a predominance of alkaline earth metal oxides (such as magnesium) being termed basic. Some form of refractories high in alumina, chromite or zirconia may be termed neutral.

The selection of a refractory for use in a specific construction depends upon the character of the metal, slag, glass or other composition with which the refractory will come in contact and the temperature range which is encountered in practice. Although some workers in this field may have different opinions as to whether a highly siliceous, a neutral or high alumina refractory or a basic refractory is best adapted for use in a given instance, all of them will probably agree that the primary cause of failure or short refractory life can be attributed to faults or imperfections due to improper setting of preformed refractory blocks, brick, etc., an imperfect bonding between said refractory construction units and the inability of construction techniques to provide a resilient, compressible and at the same time firm, bond between said units (which is capable of absorbing the linear and volumetric changes which take place in the refractory blocks or units between normal atmospheric temperatures existing during construction and the high temperatures encountered in active service of the equipment). Even when the selected refractory can successfully resist the corrosive or solvent effect of the molten or semiviscous metal, glass or ceramic contents of a furnace or kiln, the mechanical forces due to expansion and lack of a sealing bond between refractory units may cause disastrous spalling and disruption which necessitates premature shutdown and extensive relining.

Heretofore, the art has relied upon the use of refractory mortars by means of which it is virtually impossible to maintain uniform joint thickness and which are subject to drying shrinkage etc.; or upon the use of metal plates between blocks in a kiln (as in U.S. Pat. No. 2,895,725 ), but the latter expedient is expensive, requires a great deal of time during construction and does not provide a resilient, compressible joint of a composition which provides a bond between refractory blocks or units and absorbs the expansion which normally takes place.

The present invention provides means whereby the construction of furnaces, kilns, ladles, crucibles, stopper rods and other high-temperature equipment is greatly facilitated and the effective life of such equipment materially lengthened. Generally stated, such means comprise a composition, gasket or seal made of an organic plastic containing a dispersion of heat-resistant or refractory material. Such gasket or seal may be preformed as an elastomeric strip or ribbon, T-strip, angle strip or a punched or preformed gasket (of circular, rectangular or other plan), of uniform or predetermined varying thickness. It may comprise a resilient, compressible, elastomeric surface coating on a refractory block or brick. It may comprise an extrudable, spreadable or semiliquid composition capable of being applied to metallic or refractory surfaces which are to be sealed in adjacent relation in high-temperature equipment or protected from the effects of the heat and contents, or used in expansion joints.

The elastomeric compositions are preferably selfcuring (or precured) and may contain a finely divided heat-resistant filler dispersed therein; the filler may be acid, basic or neutral in character depending upon the environment in which the refractory sealant composition is to be utilized. It may include materials which may range from those which are very refractory, such as aluminum oxide, zircon, etc., to those (such as alkaline silicates, borates, etc.) which are of low resistance to heat but facilitate the formation of refractory bonds with adjacent structural units. When a furnace or kiln is set with the composition and means of this invention, the compressible resilient characteristics of the elastomeric composition facilitate setting or construction and the attainment of uniform, predetermined spacing between structural units or elements. Upon being brought up to working temperature, the elastomer yields to the expansion of the refractories, the organic plastic content is carbonized, destroyed or burned off and the residual heat-resistant filler components, as well as the carbon from the plastic, form a refractory bond which is correlated in thickness to the expansion characteristics of the refractory. This unique mode of operation minimizes spalling, equalizes stresses in the furnace structure and greatly prolongs the life of the equipment.

From the above it will be noted that an object of the invention is to provide novel means for and methods of setting and constructing kilns, furnaces, ladles, etc. in which the life of refractory linings can be prolonged.

Another object is to provide elastomeric compositions particularly adapted for use as a gasket, sealant or bonding agent between structural elements in equipment subject to high temperatures during use.

Still another object is to provide preformed refractories provided with elastomeric, compressible surface coatings which facilitate setting, eliminate the human errors which normally take place during setting and the use of mortars, and which produce a sealing and bonding medium between such preformed refractories and other elements of high-temperature equipment.

In order to facilitate understanding and illustrate some of the forms and uses of the invention, reference will be had to the appended drawings wherein.

Figure 1:
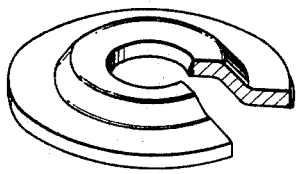
FIG. 1 is a perspective view (partly in section) of a circular ringlike preformed compressible elastomeric composition element of this invention adapted for use in constructing stopper rods of ladles handling molten metal.

The novel compositions having the properties which give rise to the unique modes of operation in the environments herein described comprise essentially any elastomeric polymer or copolymer capable of setting or curing to a resilient, compressible rubbery state, such elastomer containing a dispersion of finely divided, heat-resistant or refractory filler. The presence of modifying agents such as plasticizers, curing agents and adhesive compounds and of stiffening agents such as metallic strands or mesh, is not excluded.

It is to be observed that the organic component of the elastomeric products performs important functions: it facilitates adherence of the products to refractory blocks and metal surfaces, both because of the adhesive characteristics of the organic component and its compressibility; the latter permitting the joint products to keep themselves in the surface pits and porosities of the refractory blocks: it maintains the inorganic, heat-resistant materials in dispersion and proper mixture for placement in a joint, and holds such heat-resistant components in position which insures their presence and reaction to form the bonding, slag-resistant joint under temperature of use.

It should be emphasized that the term "elastomer" includes those polymers, copolymers and resins which can be made elastomeric by utilizing various modifiers such as plasticizers. For example, polyvinyl chloride in the unplasticized state is not considered to be an elastomer but, when plasticized, polyvinyl chloride is a compressible rubbery elastomer. Examples of elastomers which are usable in this invention are: plasticized polyvinyl chloride, plasticized polyvinyl chloride-polyvinyl acetate copolymer, polyacrylates and copolymers thereof with, e.g. 2-chloroethyl vinyl ether, chlorosulfonated polyethylene, polyurethanes, polysulfides, styrenebutadiene, butadiene, acrylonitrile, butadiene-acrylic acid, acrylonitrile-styrene, butadiene elastomers or graft polymers, butyl elastomer, chloroprene elastomer, nitrile elastomer and silicone elastomer.

The foregoing organic polymer materials are merely exemplary; any organic polymer, copolymer or mixtures thereof with suitable modifiers such as plasticizers, are utilizable in this invention provided they can be cured into a solid product which is resilient, compressible and rubbery.

As noted above, many of the polymers useful in this invention must contain a plasticizer. Examples of suitable plasticizers are tricresyl phosphate, triglycol dihexoate, dibutoxyethyl phthalate, dibutyl phthlate, adipates, and oleates.

Exemplary heat resistant fillers include substances and compounds which may be highly refractory (exhibiting softening or fusion between about 1,500° C. and 2,400° C.) of medium refractoriness (softening or fusion between about 1,100° C. and 1,500° C. or pyrometric cones 01 to 20) or even of low refractory character (softening between about 300° C. and 1,100° C.). Mixtures of such materials may be employed in order to cause the filler components of the composition to bond effectively with each other and with adjacent structural elements (whether metallic or ceramic) at the working temperatures of the equipment in which the compositions are employed. Filler materials may range from alumina, bauxite, aluminum oxide, mullite, kyanite and other aluminum silicates, diaspore, zirconium oxide, aluminates and silicates, periclase, chrome and other metal ores, magnesite, magnesium silicates, amphibole, serpentine, pyrophylite, olivine and other minerals, powdered and fibrous metals such as copper and iron and oxides thereof to kaolinitic clays, micaceous clays, montmorillonite type clays, borates and feldspars. Where working temperatures of the equipment are not excessive and high bond strength is desired, it is preferable to use a blend of filler materials which produce a residual composition in a joint, which composition has a maturing range at about the working temperature of the equipment.

The heat resistant inorganic filler, which is an indispensible component of this invention is preferably in finally divided form, e.g. 150 mesh or finer, in order to obtain a uniform, smooth product.

Preferably the compressible elastomeric compositions of this invention contain as much heat resistant filler as possible; the maximum limit being that point where the composition is no longer resilient, compressible and rubbery. Based upon present tests the amount of heat resistant inorganic filler may range anywhere from 30% to 90% by weight, based on the total weight of the composition; especially effective compositions contain anywhere from 50% or 60% to 75% by weight of the heat resistant inorganic filler dispersed therein. Cured elastomeric elements of this invention may show durometer readings of from 20 to 80 on a Shore A-2 hardness tester.

As noted above, it is sometimes desirable to use an inorganic filler composed of a mixture of high, medium and low refractory character which jointly combine to provide an effective seal over a wide range of temperatures, for example from about 500° C. up to 2,400° C. It is often desirable to have a low refractory in the heat-resistant filler because this aids in forming a better seal. The proportion of low refractory in the inorganic filler may range from 0 to from 2 percent to as high as 50 percent.

Similarly, the presence of medium refractory is desirable though not essential; however, in some instances, e.g. when the construction units will not be subjected to temperatures higher than 1,500° C., the entire heat-resistant inorganic filler may be composed of medium refractory or a mixture of medium refractory and low refractory. However, generally speaking, the amount of medium refractory in the heat-resistant inorganic filler may range from 0 to from 10% to 40% by weight.

The presence of high refractory in the heat-resistant inorganic filler gives the seal its greatest resistance to heat and molten metal. Here again, the particular amount of high refractory in the heat-resistant inorganic filler is dependent upon the temperature to which the resulting seal and/or bond between the construction units will be subjected. As has already been noted, the medium refractory can replace, in whole, or in part, the high refractory. Generally speaking, though, anywhere from 30% to 100%, by weight, of the heat resistant inorganic filler can be high refractory; however, it is most times preferred that the amount of high refractory should be between 40% and 80%, by weight, based on the weight of the heat-resistant inorganic filler.

The cured elastomeric compositions of this invention may take many forms and shapes depending upon the particular application and shape of the high-temperature construction units to which the elastomeric compositions are to be applied. Any convenient method may be utilized for forming the preformed elastomeric elements of this invention including casting, injection molding, extrusion and the like. Inasmuch as the preformed elastomeric elements of this invention are deformable and compressible when subjected to pressure they will conform to any irregularity on the surfaces of the high-temperature construction units and therefore it is not critical to have the preformed elastomeric elements conform exactly to the configuration of the units to which they are applied. Moreover, if necessary, the preformed elastomeric elements can easily be trimmed or otherwise altered to conform to the shape of the high-temperature construction units which are to be bonded and/or sealed.

Figure 2:
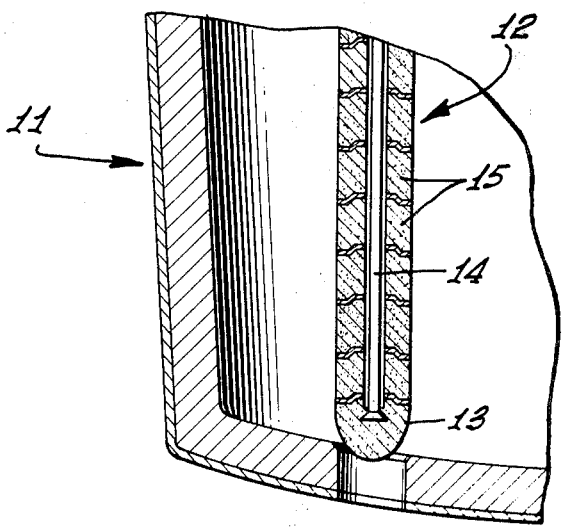
FIG. 2 is a diagrammatic sketch showing one form of a transfer ladle in which a stopper rod made by the use of the elements of FIG. 1, may be employed.

There are many uses for the elastomeric products of the present invention. For example, as shown in FIG. 2, transfer ladles generally indicated at 11 are often used for transferring molten metal from a furnace to other portions of a plant for pouring, castings, etc. These ladles are provided with a bottom opening which is normally closed by a stopper rod, generally indicated at 12, made from a lower stopper head 13 having a steel rod 14 attached thereto, the rod extending through a stack of sleeve bricks 15. Ordinarily, the sleeve bricks are carefully assembled by hand using a refractory mortar therebetween. This manual assembly using wet mortar is a time-consuming operation and before the ladle is completed, all of the mortar needs to be dry, sometimes for as long as from twenty-four to thirty-six hours. Very often, the upper and lower surfaces of the refractory sleeve blocks are provided with either a recess or a step as indicated in order to attempt to maintain the stack fairly rigid.

In accordance with the present invention, a plurality of circular gaskets such as shown in FIG. 1, made from the elastomeric compositions hereinbefore described, are provided, these gaskets having a cross section which corresponds to the cross-sectional area and shape of the sleeve blocks between which these are to be used. It is only necessary to slip the sleeve blocks and gaskets alternately along the central rod, the compressible character of the preformed elastomeric gaskets readily conforming to the irregularities in the surface of the sleeve blocks. As a result, the entire stopper rod may be quickly assembled without any drying period being involved and without the difficulties encountered in maintaining proper thickness of joints between sleeve blocks as is the case when wet mortar is employed. The heat-resistant inorganic filler within these elastomeric elements is of a character which is resistant to the molten metal being handled and tends to bond the adjacent sleeve brick together when the stopper rod and ladle are in actual use. Uniformity of the thickness of the joint is accurately maintained.

Figure 3:
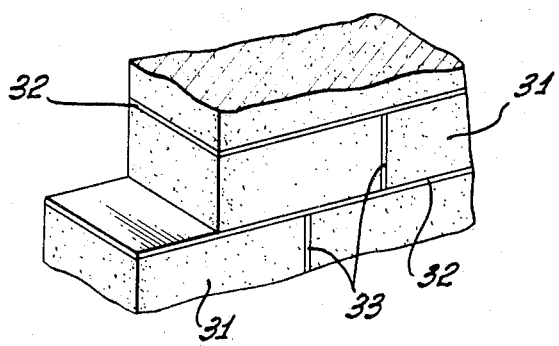
FIG. 3 is a vertical, isometric section through a portion of a furnace wall, illustrating another utilization of preformed sealing elements of the invention.

The compressible elastomeric compositions of this invention can also be preformed into sheets, and then cut to suitable size and utilized as joint material to bond refractory construction units or kiln blocks 31, shown in FIG. 3, during construction of furnaces and kilns. The compressible elastomeric preformed element 32 may be placed over one or more kiln blocks in a course and another course of kiln blocks are placed on top of the compressible elastomeric preformed element. The pressure of the weight of said kiln blocks compresses and deforms the elastomeric element so that it adapts to the irregularities in the surfaces of both the top and the bottom blocks. Shorter preformed element 33 may be placed between blocks. Thereafter, when heat is applied in the normal use of such furnaces or kilns, the organic plastic will be vaporized or burned off and the-heat resistant inorganic filler, together with the carbon from such organic plastic, will form a heat-resistant seal and bond between the kiln blocks.

Figure 4:
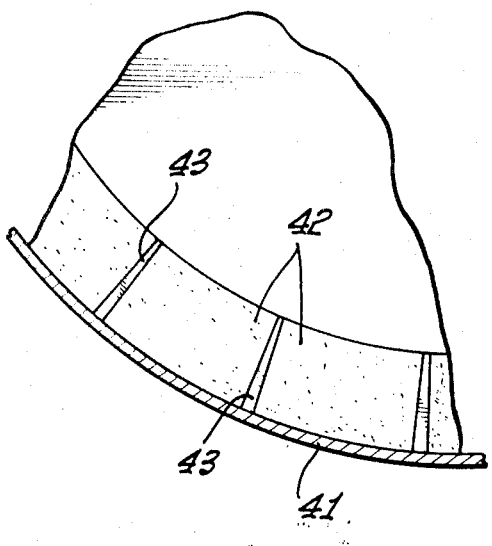
FIG. 4 is a transverse section of a portion of a rotary kiln wherein the compressible polymeric elements of the invention are employed between kiln blocks.

The compressible elastomeric elements of this invention can be utilized in rotary kilns, shown in FIG. 4, which includes a metal lining or shell 41 serving to hold rotary kiln blocks 42 located in a plan perpendicular to the axis of lining 41. The compressible elastomeric elements 43 may be placed between opposed surfaces of kiln blocks 42 by placing the elastomeric element against one surface of the kiln block and held there until another block can be set in place or, in the alternative, the elastomeric element 43 can be applied to surface of the kiln block by means of some sort of adhesive, such as an epoxy resin, in order to hold it in place. In addition, the inner surface of the metal liner 41 of the rotary kiln may be provided with an uncured composition of this invention to form a bond between the kiln blocks and the liner. When the temperature is reached at which the furnace is utilized, the organic plastic will vaporize or burn off and there will be formed a heat-resistant seal and bond between the kiln blocks, and the liner and the kiln blocks.

Figure 5:
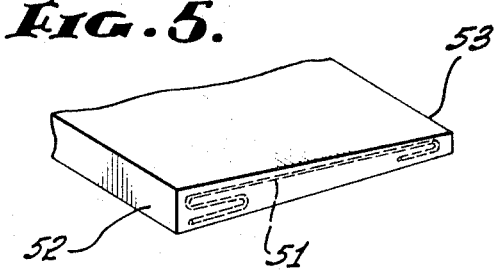
FIG. 5 is a section taken through a preformed elastomeric component illustrating in greater detail a modified internal structure, this form of component being specifically adapted for use in rotary kilns, arched furnace roofs, etc.

The preformed compressible elastomeric composition of this invention may contain reinforcing means 51, shown in FIG. 5, which may be wire mesh, expanded sheet metal, preformed metal strips or the like. In this exemplary embodiment the preformed compressible elastomeric composition element has a thick end 52 and a thin end 53 which makes it adaptable for use in rotary kilns, arched furnaces and the like.

The specific preformed compressible elastomeric compositions exemplified in the foregoing can be produced as exemplified more fully infra. The particular elastomeric products have been extensively tested under actual conditions of use and in all instances the preformed compressible elastomeric compositions performed satisfactorily. All percentages are by weight unless otherwise specified. A specific starting composition is as follows:

| Component | Amount |
|---|---|
| 325 mesh quartz (high refractory) | 42.6% |
| 200 mesh pyrophyllite (medium refractory) | 13.4% |
| Dry sodium silicate (low refractory) | 2.3% |
| PR-5C* | 41.7% |

*PR-

C is a plastisol manufactured by Poly Resins, Inc. and contains 33⅓

% homopolymer paste vinyl chloride resin, 33⅓

% dioctyl phthalate, and 33⅓

% butyl benzyl phthalate.

The heat-resistant inorganic filler is thoroughly mixed into the liquid RPR-5 C. The thus formed mixture is injection molded into an aluminum mold and vibrated to remove air. Neither the mold nor mixture is preheated. The mixture is cured at 350° F. for 15 minutes for smaller objects, e.g. 5-inch diameter washer. For a 7-inch diameter washer, the mixture should be cured for a period of 20 minutes. For larger objects, the cure time is correspondingly lengthened. After the mixture is cured, the mold is water quenched. The mold is cleaned with acetone after the cured material is removed from the mold.

The resulting cured product is a preformed resilient elastomeric product having a circular gasket shape and durometer readings of between 45 and 50.

Another series of elastomeric gaskets were produced in exactly the same manner as set forth above except the pyrophyllite was replaced with MIca Red Clay (a montmorillionitic clay). The elastomeric gaskets thus produced had the desired physical properties and also had satisfactory resistance to molten metal as determined by the static pocket test filled with molten steel.

Another series of preformed resilient elastomeric sheets were produced in exactly the same manner as set forth above except they were formed into sheets by injection molding between two aluminum plates and the heat-resistant inorganic filler mixture was replaced with ferric oxide in an amount of 50% by weight, based on the total compressible elastomeric product. The elastomeric sheets thus produced have durometer readings of between 50 and 55 and the other desired physical properties, as well as satisfactory resistance to molten metal as determined by the static pocket test filled with molten steel.

A further series of elastomeric sheets were produced in exactly the same manner except the ferric oxide was replaced with iron. The thus produced sheets were compressible and resilient and showed good resistance to molten metal as determined by the static pocket test filled with molten steel.

Examples showing effect of varying percentage of heat resistant inorganic filler material

| Sample No. | PR-6C* | Quartz (-200 M) | Pyrophyllite | Sodium silicate "G" | Percent solids | Remarks |
|---|---|---|---|---|---|---|
| D-7470-A... | 41.7 | 42.6 | 13.4 | 2.3 | 58.3 | Product highly compressible. |
| D-7470-B... | 36.6 | 46.4 | 14.5 | 2.5 | 63.4 | Product highly compressible. |
| D-7470-C... | 32.3 | 49.4 | 15.6 | 2.7 | 67.7 | Increased stiffness |
| D-7470-D... | 30.5 | 50.8 | 16.0 | 2.7 | 69.5 | Stiff but still compressible. |

*PR-6C is a plastisol manufactured by Poly Resins, Inc. and contains homopolymer paste vinyl chloride resin (33⅓% by weight) and, as plasticizer, hexanol isobutyrate (66⅔% by weight).

The elastomeric products were produced by the method described in detail above in the form of a washer. All possessed the requisite properties to easily and effectively form a dense heat-resistant seal between high-temperature elements.

Examples showing effect of low refractory on fusion between high temperature ceramic elements

| Sample No. | PR-5C | Quartz (-200 M) | Pyrophyllite | Sodium silicate "G" | Ground glass | Remarks: Laboratory fusion test between ceramic elements |
|---|---|---|---|---|---|---|
| D-7474-B... | 41.7 | 23.0 | 13.0 | 2.3 | 20.0 | Greatest fusion to ceramic element. |
| D-7474-C... | 41.7 | 28.0 | 13.0 | 2.3 | 15.0 | Less fusion than B |
| D-7475-D... | 41.7 | 33.0 | 13.0 | 2.3 | 10.0 | Less fusion than C. |
| D-7475-E... | 41.7 | 38.0 | 13.0 | 2.3 | 5.0 | Least fusion. |

Other exemplary embodiments of this invention include heat-resistant inorganic filler having the following compositions: 45–55% chrome ore, 40%–50% alumina, and from 0–5% sodium silicate; 35%–50% zircon and 65%–50% alumina; and 40%–60% chrome ore, 40%–60% magnesia and 0–5% ground glass. The foregoing exemplary filler compositions may be mixed with from 35%–50% of an organic plastic and cured and formed into various shapes as exemplified above.

Figure 6:
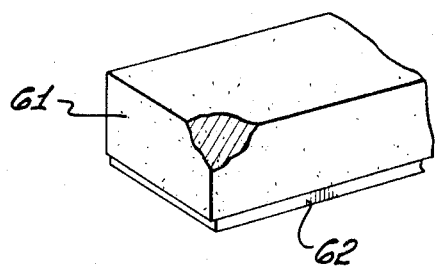
FIG. 6 is a view of a preformed refractory block provided with an adhering surface layer of the elastomeric compressible composition of this invention.

In addition to encompassing the preformed compressible elastomeric products of various shapes, as exemplified above, this invention also embodies a solid preformed refractory ceramic composition construction unit which is adapted for use in furnaces, kilns, ovens hearths, as described *supra*, wherein the surface of such construction unit 61, shown in FIG. 6, is provided with an adhering resilient elastomeric surface layer 62. This unit can be constructed by applying a cured resilient elastomeric sheet to one or more surfaces of the construction unit by any suitable means such as an adhesive resin, e.g. an epoxy or polysulfide resin. In the alternative, the construction unit can be dipped into a liquid or viscous organic plastic which contain uniformly dispersed therein a heat-resistant inorganic filler material to form an adherent skin of suitable thickness. The construction unit is then removed from said organic liquid plastic and allowed to cure by application of heat or by mere exposure to ambient conditions. Refractory block provided with adhesive joint-forming composition may be shipped directly to the user.

The compositions of this invention can also be applied directly to construction units of kilns or the like by a calking gun. In this case the elastomeric composition is in the form of a viscous liquid, such as a polyvinyl chloride plastisol, containing from 30% to 90% heat-resistant inorganic filler. The composition is then allowed to cure or set *in situ*.

While we have described this invention with respect to certain specific embodiments, it is understood that various modifications may be made thereof without departing from the spirit and scope of the invention as claimed hereinafter.

It is understood that equipment, specific particle size, proportions, etc. referred to in the examples, are simply illustrative of types and ranges which may be used and are for the purpose of illustration only and are not to be considered limiting.

We claim:

1. In a refractory construction having a plurality of high-temperature units, adjacent high-temperature units having opposed surfaces spaced apart by bonding and sealing means for such units:

the improvement wherein said bonding and sealing means are preformed, resilient, cured elastomeric elements having a plan form approximating the surfaces of said units which are to be bonded and sealed and a thickness compressible to the thickness of a seal-joint desired between such high-temperature units during use, said elements consisting essentially of an organic polymer carrying a finely divided, heat-resistant inorganic filler dispersed therein.

2. The improvement according to claim 1 wherein the cured elastomeric elements have a durometer reading of between 20 and 80.

3. The improvement according to claim 1 wherein the cured elastomeric elements have metal reinforcing means embedded therein.

4. The improvement according to claim 1 wherein the amount of finely divided, heat-resistant inorganic filler dispersed in said organic polymer is from 30 to 90% by weight based on the elastomeric element.

5. The improvement according to claim 4 wherein the heat-resistant inorganic filler is a mixture of refractory materials having different melting points and adapted to form a seal at temperatures of use of the refractory construction, said mixture of refractory material consisting essentially of from 2% to 50%, by weight, of low refractory, from 10% to 40%, by weight, of medium refractory and from 40% to 80%, by weight, of high refractory, the said weight being based on the weight of the heat-resistant inorganic filler.

6. The improvement according to claim 1 wherein the organic polymer is thermoplastic.

7. The improvement according to claim 6 wherein the organic polymer is plasticized polyvinyl chloride.

8. The improvement according to claim 1 wherein the cured elastomeric elements have a durometer reading of between 20 and 80 and the amount of finely divided, heat-resistant inorganic filler dispersed in said organic polymer is from 30% to 90% by weight based on the elastomeric elements.

9. In a method for constructing high-temperature equipment units, said equipment units having high-temperature elements bonded together, the improvement comprising: easily forming a bond and seal, resistant to heat and molten metal, between opposed surfaces of at least two of said high-temperature elements, by aligning on a first surface of one of said high-temperature elements a preformed, compressible, elastomeric, resilient element having a plan form approximating the surface of said high-temperature element to be bonded and sealed and a thickness compressible to the thickness of a seal joint between said high-temperature elements during use, said preformed, resilient element consisting essentially of an organic polymer carrying finely divided heat-resistant inorganic filler dispersed therein, the amount of inorganic filler being from about 30% to 90% by weight, based on the total weight of the resilient element, in the area where said bond and seal is to be formed, placing a second surface of another high-temperature element in contact with said preformed resilient element and opposed but spaced from said first surface, deforming said preformed resilient element so that said preformed resilient element is in contact with substantially the entire sealing area of both opposed surfaces, subjecting said preformed resilient element and said high-temperature elements to a temperature in excess of 500° C. whereby the organic polymer is vaporized and there is formed a heat-resistant bond and seal of heat-resistant material, including carbon from said polymer.

10. A method according to claim 9 wherein the element has a durometer reading of between 20 and 80.

11. A method according to claim 9 wherein the element has metal reinforcing means embedded therein.

12. A method according to claim 9 wherein the heat-resistant inorganic filler is a mixture of refractory materials having different melting points and adapted to form a seal at temperature of use of the construction unit, said heat-resistant, inorganic filler consisting essentially of from a% to 50%, by weight, of low refractory, from 10% to 40%, by weight, of medium refractory, and from 40% to 80%, by weight, of high refractory, the said weight being based on the weight of the heat-resistant inorganic filler.

13. A method according to claim 9 wherein the organic polymer is plasticized polyvinyl chloride.